F. A. BRUCKMAN.
STOP MECHANISM FOR PASTRY MAKING MACHINES.
APPLICATION FILED OCT. 25, 1920.
1,379,080.
Patented May 24, 1921.
2 SHEETS—SHEET 2.
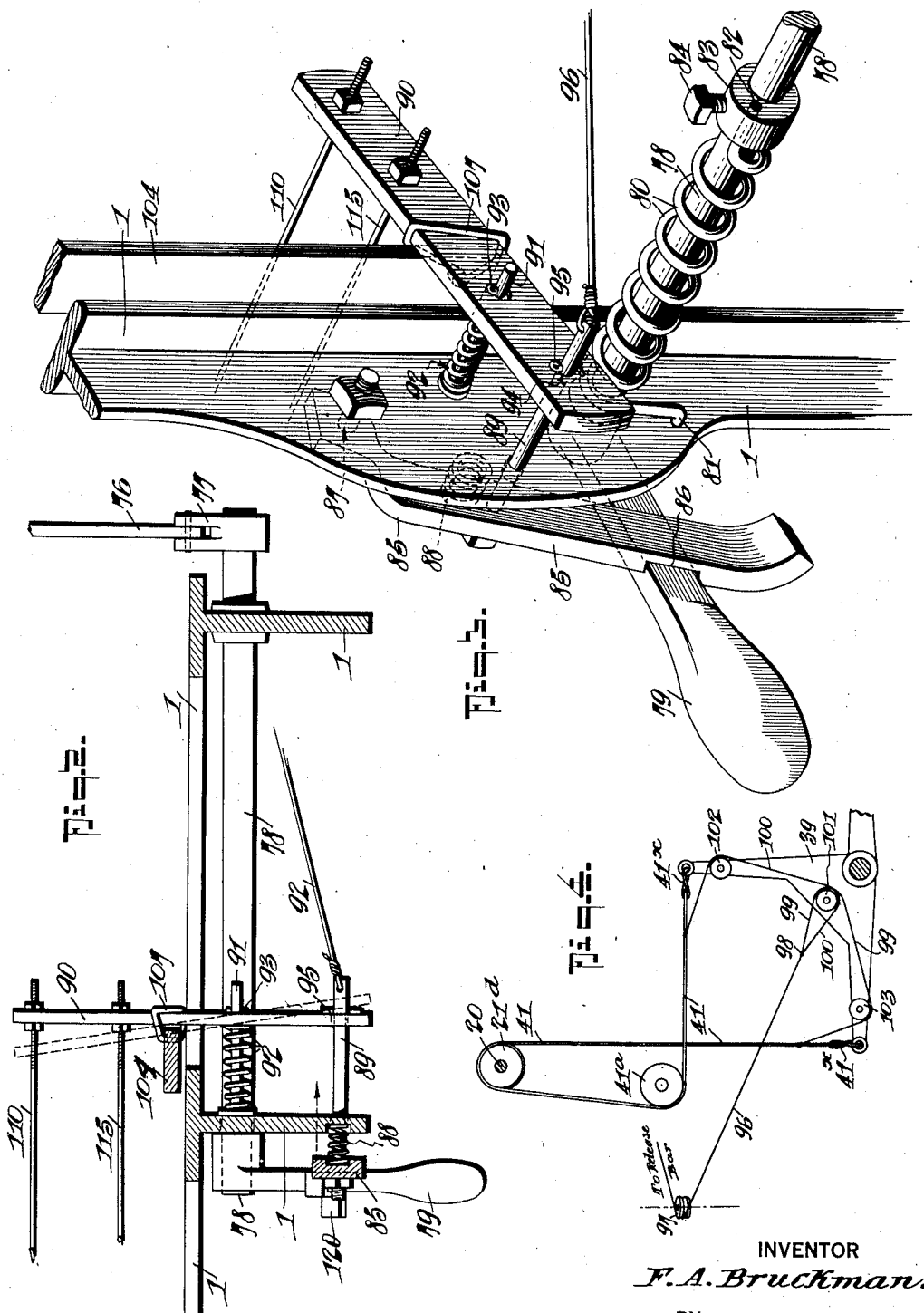
INVENTOR
F. A. Bruckman.
BY
Fred J. Dieterich & Co.
ATTORNEYS

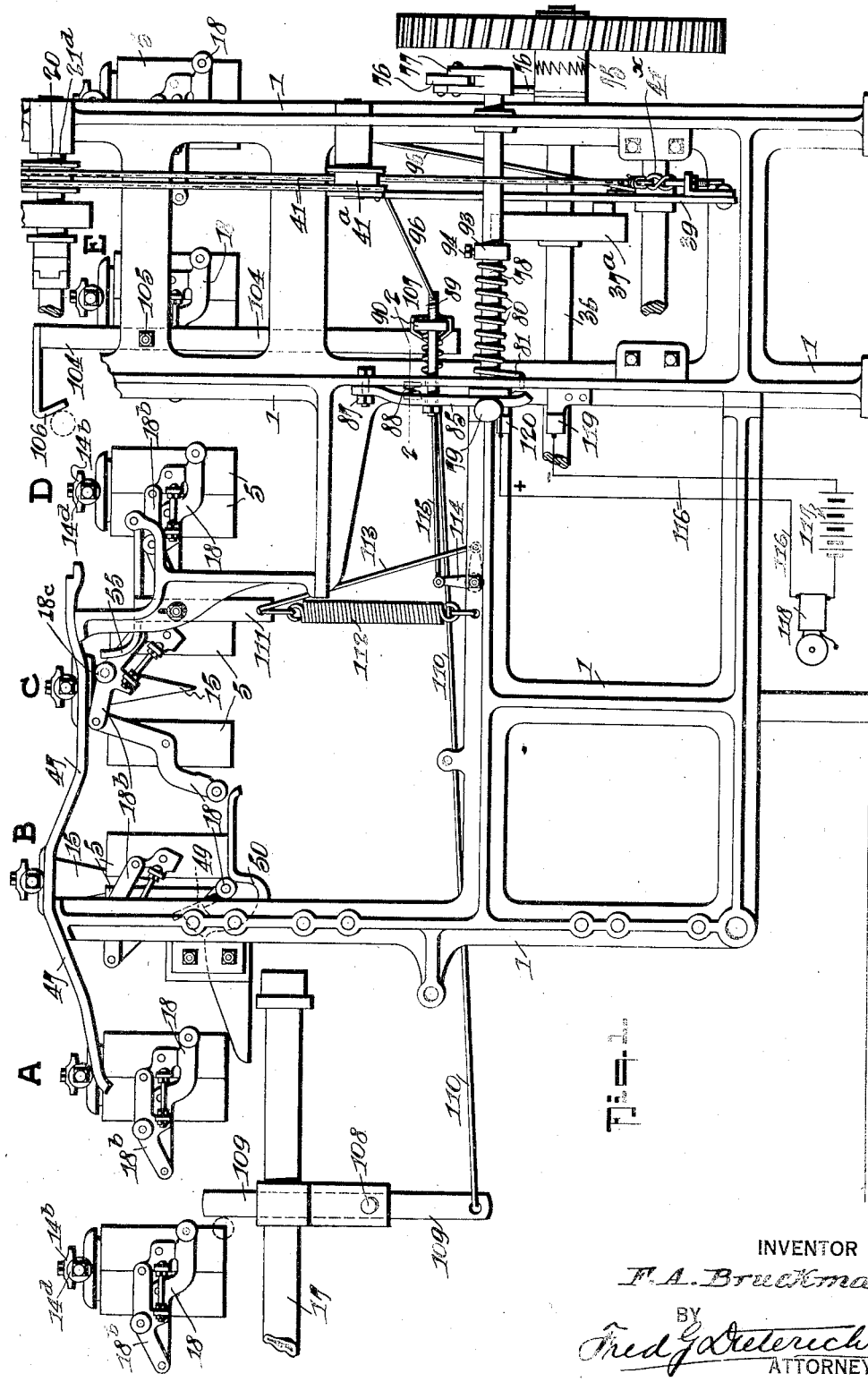

UNITED STATES PATENT OFFICE.

FREDERICK A. BRUCKMAN, OF PORTLAND, OREGON.

STOP MECHANISM FOR PASTRY-MAKING MACHINES.

1,379,080.  Specification of Letters Patent.  Patented May 24, 1921.

Application filed October 25, 1920. Serial No. 419,462.

*To all whom it may concern:*

Be it known that I, FREDERICK A. BRUCKMAN, a citizen of the United States, residing at Portland, in the county of Multnomah and State of Oregon, have invented certain new and useful Improvements in Stop Mechanism for Pastry-Making Machines, of which the following is a specification.

This invention relates to automatic machinery for the manufacture of cup pastry articles such as ice cream cones and the like and it especially relates to the well-known "Bruckman type of machine" (see United States Letters Patent #1,071,027, issued August 26, 1913). It occasionally happens with baking machinery, as well as with other kinds of machinery, that the machine will sometimes "load" and fail to function properly owing to the variation in the material worked upon or some unusual condition of affairs; in cone baking machines, the molds do not always relieve themselves of their contents and occasionally a portion of the baked product remains in the mold cavity so that a succeeding charge of batter sometimes causes breakage of parts. For example, if the core fails to gravitate to its normal position after the mold unit is loaded, the core lock may break, owing to the unusual strain impressed on it when it engages the locking cam, or if the parts are sufficiently strong so that the core will be forced home into the clogged mold the mold locks themselves may give way or their pivot studs may be sheared off which would prevent the mold locking rollers on the locking levers from properly engaging their unlocking cams at the unlocking station; or it may be that when the unit leaves the extracting station the sections of the mold will become jammed and not close properly as might happen, for example, if a piece of baked dough gets between the contacting faces of the mold halves. Thus, the mold sections will not close properly and thereby there is imparted undue strains on the locking cam and locking levers which might cause breakage. It is therefore the particular object of the present invention to provide a means for automatically and instantaneously stopping the machine in the event that the machinery fails to function properly. It is also an object of the invention to indicate to the attendant the fact that the machine has stopped and requires attention.

In carrying out the invention I provide the machine with a control shaft having a handle and being adapted to be turned to throw the first motion shaft (or other prime moving part) clutch into and out of mesh to start or stop the machine, a device being provided which continuously tends to move the control shaft to the "stop" while a latch or trigger is provided to hold the shaft to the
"run" position.

Coöperating with this latch or trigger is a throw-out lever which is connected up with several safety devices that are located at the different places on the machine where trouble may occur and which, when the particular parts they coöperate with are out of place, will move the throw-out lever to release the trigger and permit the control shaft to move to the stop position; a signal device being arranged to become operative when the control shaft is in the "stop" position and thereby notify the attendant of the fact that the machine has stopped and needs attention.

The invention furthermore resides in those novel details of construction, combination and arrangement of parts, all of which will be first fully described, then be specifically pointed out in the appended claims and illustrated in the accompanying drawings, in which:

Figure 1 is a developed elevation largely diagrammatic in nature and illustrating the application of the invention to the well-known Bruckman type of machine.

Fig. 2 is an enlarged detail horizontal section on the line 2—2 of Fig. 1.

Fig. 3 is an enlarged detail perspective view showing the control shaft, the trigger and the trigger release lever with the connections from the safety devices thereto.

Fig. 4 is a diagrammatic view of the bell crank and operating connection with the dipping arm shaft showing the present invention applied thereto.

In the drawings, in which like numerals and letters of reference indicate like parts in all of the figures, 1 represents the frame of the machine. 15 indicates the cores and 5—5 designates the female mold units. 18—18$^b$ represent the mold lock levers constituting a toggle lock for holding the female mold sections together and 14$^b$ indicates the core bar which is provided at its front end with the roller 14$^d$ to engage the lifting track 47.

49 and 50 designates the mold unlocking and opening cams and 55 indicates the mold closing and locking cam. 17 is the gas supply pipe for the burners, 20 is the dipping arm shaft and 36 is the first motion shaft to which power is applied for operating the mechanism and it is on this shaft that the cam 37ª, which operates the bell crank 39 is located. 41 is the cable or chain which is connected to the arms of the bell crank and passes over an idler 41ª and a pulley 21ᵈ, the latter being located on the dipping crank 20. All of the foregoing described parts are essentially the same in purpose and function to the parts bearing the same numbers and letters of reference in the Bruckman Patent #1,071,027 hereinbefore referred to.

In carrying out my invention the first motion shaft 36, or any other suitable part of the machine adjacent to the power applying motor, is provided with a suitable clutch 75 which is adapted to be thrown into and out of engagement by the operation of a suitable connection 76 with a crank 77 on the control shaft 78. The control shaft 78 is provided with a handle 79 and is adapted to be turned in one direction by a spring 80, one end 81 of which is secured in the frame 1 of the machine and the other end 82 is secured to a collar 83 which may be fastened by a set screw 84 so that the tension of the spring 80 may be regulated. When the machine is running, i. e., when the clutch 75 is "in," the handle 79 is held up by a latch or trigger 85 which has a notch 86 to receive the handle 79 and which is loosely fastened at 87 to the frame of the machine, the trigger 85 being pressed into engagement with the handle 79 by a coil spring 88. 89 is a pin passing through the trigger 85 and through an aperture in the frame 1 which, when applied, is adapted to release the trigger 85 from handle 79 so that the spring 80 may function to move the control shaft 78 to the "stop" position, as will be later more clearly understood. 90 is a throw-out lever which is loosely mounted on a stud 91 and is held in place by a spring 92 and cotter pin 93 so that the lever 90 can yield on the stud 91. The lever 90 is apertured at 94 so that the pin 89 may pass through the same, a cotter pin 95 being provided to hold the pin and lever in proper correlative position. 96 is a cable which is secured to the pin 89 and passes over a pulley 97 and is secured at 98 to two cables 99—100 which pass over an idler pulley 101 on the bell crank 39 and over other idler pulleys 102—103 also located on the bell crank (see Fig. 4) the ends of the cables 99 and 100 being connected to the cable or chain 41 which imparts the motion of the bell crank to the dipping arm shaft 20.

It should be understood that the cable or chain 41 is provided with breakable or separable links 41ˣ which are adapted to disconnect the cable from the bell crank in the event of undue strains.

104 is a lever pivoted at 105 and having a cam 106 which is adapted to be engaged by the core bar 14ᵇ as the unit leaves the loading position, station D, in the event that the core does not seat properly. The lever 104 is suitably connected at 107 with the throw-out lever 90 so that when the lever 104 is rocked by the engagement of the core bar with the cam 106 the throw-out lever 90 will be moved to the dotted position shown in Fig. 2, thus causing the pin 89 to be pulled to release the trigger 85 from the handle 79, the spring 80 thereupon functioning to turn the shaft 78 to stop the machine.

Suitably pivoted at 108 is a lever 109 which is connected by a rod or cable 110 with the throw-out bar 90 and which is adapted to be engaged by a part of the mold locking levers 18—18ᵇ in the event that the mold is not properly locked when the unit arrives at the core unlocking station that preceding station A. For instance, if the mold is unlocked at the station preceding station A, or if there is an obstruction, due to the breaking of any part of the mold lock parts, the lever 109 will be rocked to pull the throw-out lever 90 to the dotted position shown in Fig. 2 and thus stop the machine.

The cam 55 is carried by a slide 111 and is pulled down by a spring 112. If the molds do not close properly, when the mold lock roller 18ᶜ engages the cam 55, that cam will be elevated against the tension of the spring 112, thus pulling up on a rod or handle 113 which is connected to the slide 111 and to a bell crank 114, the latter being connected by a rod or cable 115 to the throw-out lever or bar 90 so that undue elevation of the cam 55 will cause the lever 90 to be rocked to withdraw the trigger from the handle 79 and cause the machine to be stopped.

While I have illustrated the invention as applied only to four of the parts of the machine most likely to cause trouble it is to be understood that the invention may be readily adapted to protect other parts of the machine if found desirable, and I do not wish to be limited to the particular details shown and described beyond what may be specifically set forth in the appended claims.

If desired, a signaling arrangement of any approved type may be employed which is designed to operate when the control shaft 78 is in the "stop" position. For purposes of illustration I have indicated an electric circuit 116 including a source of energy 117 and signal 118, the circuit having terminals 119 and 120, one of which is insulated and mounted on the frame 1 while the other is insulated and mounted on the handle 79, the two being so arranged that when the handle is down they will contact and close the electric circuit thereby notifying the attendant that the machine has stopped and requires attention, it being understood, of course, that the signal 118 may be an annunciator connected up with a series of machines so that any one of the machines failing to operate will give the desired annunciation.

From the foregoing description, taken in connection with the accompanying drawings, it is thought the complete construction, operation and advantages of my invention will be readily understood by those skilled in the art.

What I claim is:

1. In a pastry making machine wherein is provided relatively movable baking mold units and relatively stationary operating cams therefor, a mold charging mechanism and a shaft from which the mold parts are driven; a stop mechanism comprising a control shaft, means holding said control shaft to the "run" position and means operative by a disorganized part of the machine for releasing said holding means and moving said control shaft to the "stop" position.

2. In a pastry making machine wherein is provided relatively movable baking mold units and relatively stationary operating cams therefor, a mold charging mechanism and a shaft from which the mold parts are driven; a stop mechanism comprising a control shaft, means holding said control shaft to the "run" position, means operative by a disorganized part of the machine for releasing said holding means, and means for moving said control shaft when released to the "stop" position.

3. In a pastry making machine, a relatively movable series of baking mold units, a relatively stationary set of camming elements, a first motion shaft and clutch device, a control shaft connected with said clutch device, and means actuated by a disorganized part of the machine for moving said control shaft to throw out the clutch and stop the machine.

4. In a pastry making machine wherein is provided a relatively movable series of baking molds and a relatively immovable set of camming elements, a first motion shaft and a clutch device, a control shaft connected with said clutch device, a trigger member for holding said control shaft in the "run" position, and means actuated by a disorganized part of the machine for moving said trigger to release said control shaft, and means for moving said control shaft when released to the "stop" position.

5. In a pastry making machine wherein is provided a relatively movable series of baking molds and a relatively immovable set of camming elements, a first motion shaft and a clutch device, a control shaft connected with said clutch device, a trigger member for holding said control shaft in the "run" position, means actuated by a disorganized part of the machine for moving said trigger to release said control shaft, means for moving said control shaft when released to the "stop" position, said actuated means comprising a trigger release lever, a connection between said trigger release lever and said trigger, an actuating member adapted to be engaged by a disorganized part of the machine and a connection between said actuating member and said trigger release lever.

6. In a stop mechanism of the character described, a control shaft, a spring continuously tending to move said control shaft to one position, a trigger for holding said control shaft to another position, a stud, a trigger release lever yieldably pivoted on said stud and connected with said trigger, means for pressing said trigger to the holding position, and means actuated by a disorganized part of the machine for moving said trigger release lever to release said trigger.

7. In a stop mechanism of the character described, a control shaft, a spring continuously tending to move said control shaft to one position, a trigger for holding said control shaft to another position, a stud, a trigger release lever yieldably pivoted on said stud and connected with said trigger, means for pressing said trigger to the holding position, means for moving said trigger release lever to release said trigger, said last named means including a device operable by a disorganized part of the machine.

8. In a device of the character described, a control shaft, a handle on said shaft, a spring continuously tending to move said shaft to one direction, a trigger engaging said handle to hold the same against the tension of the spring, means tending to hold said trigger in engagement with said handle, and means connected with said trigger and operable by a disorganized part of the machine for releasing the trigger.

9. In a device of the character described, a control shaft, a handle on said shaft, a spring continuously tending to move said shaft to one direction, a trigger engaging said handle to hold the same against the tension of the spring, means tending to hold said trigger in engagement with said handle, means connected with said trigger and operable by a disorganized part of the machine for releasing the trigger, said last named means comprising a pin connected with the trigger, a device operated by a disorganized part of the machine and connected with said pin for pulling the trigger out of engagement with the handle.

10. In a device of the character described, a control shaft, a handle on said shaft, a spring continuously tending to move said shaft to one direction, a trigger engaging said handle to hold the same against the tension of the spring, means tending to hold said trigger in engagement with said handle, means connected with said trigger and operable by a disorganized part of the machine for releasing the trigger, said last named means comprising a pin connected with the trigger, a device operated by a disorganized part of the machine and connected with said pin for pulling the trigger out of engagement with the handle, said last named device comprising a trigger release bar engaging the pin and elements adapted to be engaged by disorganized parts of the machine connected with the trigger release bar for actuating the same.

FREDERICK A. BRUCKMAN.